United States Patent
Valdivia Guerrero et al.

(10) Patent No.: US 10,033,318 B2
(45) Date of Patent: Jul. 24, 2018

(54) CONTROLLER SELF-COMMISSIONING FOR THREE-PHASE ACTIVE POWER ELECTRONICS CONVERTERS

(71) Applicant: Otis Elevator Company, Farmington, CT (US)

(72) Inventors: Virgilio Valdivia Guerrero, Cork (IE); Francisco Jose Gonzalez Espin, Cork (IE); Raymond Francis Foley, Cork (IE)

(73) Assignee: OTIS ELEVATOR COMPANY, Farmington, CT (US)

( * ) Notice: Subject to any disclaimer, the term of this patent is extended or adjusted under 35 U.S.C. 154(b) by 147 days.

(21) Appl. No.: 15/251,246

(22) Filed: Aug. 30, 2016

(65) Prior Publication Data
US 2017/0063267 A1    Mar. 2, 2017

Related U.S. Application Data

(60) Provisional application No. 62/212,168, filed on Aug. 31, 2015.

(51) Int. Cl.
*H02P 23/00* (2016.01)
*H02J 3/38* (2006.01)
(Continued)

(52) U.S. Cl.
CPC ........ *H02P 23/0004* (2013.01); *G05B 13/022* (2013.01); *H02J 3/383* (2013.01);
(Continued)

(58) Field of Classification Search
CPC ...... H02P 23/0004; H02P 27/06; H02J 3/383; H02J 3/386; H02J 3/24; H02J 3/48;
(Continued)

(56) References Cited

U.S. PATENT DOCUMENTS

| 5,929,400 A | 7/1999 | Roy |
| 7,072,194 B2 | 7/2006 | Nayar et al. |

(Continued)

FOREIGN PATENT DOCUMENTS

| CN | 102749488 A | 10/2012 |
| CN | 103257271 A | 8/2013 |

(Continued)

OTHER PUBLICATIONS

Hitachi, "Hitachi Industrial WJ200 Series AC Variable Speed Drives (Industrial Inverters)", accessed Aug. 29, 2016, available at http://www.hitachi-america.us/ice/inverters/products/ac_variable_speed_drives/wj200/, 2 pages.

(Continued)

*Primary Examiner* — Robert Deberadinis
(74) *Attorney, Agent, or Firm* — Cantor Colburn LLP

(57) ABSTRACT

A system for modulating a current level of a power grid includes a perturbation module that injects a sinusoidal signal, at a cross-over frequency, to modulate a duty cycle to a power converter connected to the power grid; a current controller that monitors a reference current and a current at grid-side terminal of the power converter, the current controller further monitors a current of the power grid; and a parameter calculation module that calculates a plurality of gain values for the current controller based at least in part on a phase margin, a cross-over frequency, a current of an alternating current side of the power converter, and the duty cycle.

15 Claims, 3 Drawing Sheets

(51) Int. Cl.
*H02M 7/797* (2006.01)
*H02P 27/06* (2006.01)
*G05B 13/02* (2006.01)
*H02M 1/00* (2006.01)
*H02M 7/5387* (2007.01)
*H02J 3/24* (2006.01)
*H02J 3/48* (2006.01)

(52) U.S. Cl.
CPC .............. *H02J 3/386* (2013.01); *H02M 1/00* (2013.01); *H02M 7/53871* (2013.01); *H02M 7/797* (2013.01); *H02P 27/06* (2013.01); *H02J 3/24* (2013.01); *H02J 3/48* (2013.01)

(58) Field of Classification Search
CPC ...... H02M 7/797; H02M 1/00; H02M 7/5381; G05B 13/022
See application file for complete search history.

(56) References Cited

U.S. PATENT DOCUMENTS

| | | |
|---|---|---|
| 7,372,174 B2 | 5/2008 | Jones et al. |
| 7,982,325 B2 | 7/2011 | Andersen |
| 8,879,290 B2 | 11/2014 | Li et al. |
| 8,880,228 B2 | 11/2014 | Kumar |
| 9,013,067 B2 | 4/2015 | Kuehn |
| 2002/0019715 A1 | 2/2002 | Cohen et al. |
| 2012/0112551 A1 | 5/2012 | Li et al. |
| 2013/0268219 A1 | 10/2013 | Malek et al. |
| 2013/0278308 A1 | 10/2013 | Larsen |
| 2014/0100705 A1 | 4/2014 | Shi et al. |
| 2014/0247630 A1 | 9/2014 | Scharf |
| 2014/0265596 A1 | 9/2014 | Yuan |
| 2014/0303795 A1 | 10/2014 | Hommelberg et al. |
| 2015/0015216 A1 | 1/2015 | Willis et al. |
| 2015/0070948 A1 | 3/2015 | Johnson et al. |

FOREIGN PATENT DOCUMENTS

| | | |
|---|---|---|
| CN | 104135026 A | 11/2014 |
| EP | 0936730 A2 | 8/1999 |
| EP | 2001120 A2 | 12/2008 |
| EP | 2871743 A1 | 5/2015 |
| WO | 2010018424 A1 | 2/2010 |
| WO | 2013142553 A2 | 9/2013 |

OTHER PUBLICATIONS

Liserre, Marco et al., "Stability of Photovaltic and Wind Turbine Grid-Connected Inverters for a Large Set of Grid Impedance Values", IEEE Transactions on Power Electronics, vol. 21, No. 1, Jan. 2006, pp. 263-272.

Martin, Daniel et al., "Autotuning of Digital Deadbeat Current Controllers for Grid-Tie Inverters Using Wide Bandwidth Impedance Identification", IEEE Transactions on Industry Applications, vol. 50, No. 1, Jan./Feb. 2014, pp. 441-451.

Martins, Antonio P. et al., "Robust Converter Synchronization to a Weak Grid Through a DFT-based Method", RE&PQJ, vol. 1, No. 4, Apr. 2006, pp. 57-63.

Massing, Jorge Rodrigo et al., "Adaptative Current Control for Grid-Connected Converters With LCL Filter", IEEE Transactions on Industrial Electronics, vol. 59, No. 12, Dec. 2012, pp. 4681-4693.

Rocabert, Joan et al., "Intelligent Connection Agent for Three-Phase Grid-Connected Microgrids", IEEE Transctions on Power Electronics, vol. 26, No. 10, Oct. 2011, pp. 2993-3005.

Svensson, Jan, "Grid-Connected Voltage Source Converter", Technical Report No. 331, submitted to School of Electrical Engineering Chalmers University of Tech., 1998, 69 pages.

EP Search Report for application EP 16186241.2, dated Jan. 30, 2017, 17pgs.

Rashid, Muhammad, "Power Electronics Handbook", Referex 2001, XP040425239, Academic Press, Elsevier B.V., 2001, 910pgs.

CONTROLLER SELF-COMMISSIONING FOR THREE-PHASE ACTIVE POWER ELECTRONICS CONVERTERS

CROSS-REFERENCE TO RELATED APPLICATIONS

This application claims the benefit of U.S. provisional patent application Ser. No. 62/212,618, filed Aug. 31, 2015, the entire contents of which are incorporated herein by reference.

BACKGROUND

The present disclosure relates generally to a power control system and, more specifically, to a control system for an active power converter interfacing an energy source (e.g., photovoltaic generator or wind turbine), load (motor drive for elevator) or storage system (e.g. battery), connected to a power grid.

Three-phase grid-connected power electronics converters are widely applied on areas such as regenerative drives, energy storage connected to the grid, and renewable generation and transportation. When the converters are connected to weak electrical grids, the grid impedance interacts with the local control. This may results in an otherwise stable controller becoming unstable (or having low stability margins) when installed on end-user facilities. The grid impedance of end-user facilities is typically unknown at the time of installation, which may require the installer to have advanced technical knowledge, and/or result in a delayed commissioning process.

Self-commissioning techniques for power electronic converters can be used to handle uncertainty of model parameters. For three-phase converters, techniques may assume a fixed motor model and control strategy. Techniques may also apply perturbations on several frequencies.

However, only a few self-commissioning techniques have been reported for grid-side converters. The reported techniques applied to grid-connected converters are complex and oriented to particular control strategies such as deadbeat control and state-space adaptive control. The existing self-commissioning techniques typically require injection of a perturbation(s) at multiple frequencies to identify the dynamic characteristics of the electrical grid.

BRIEF DESCRIPTION

According to a non-limiting embodiment of the present disclosure, a system for modulating a current level of a power converter connected to the grid comprises a perturbation module that injects a sinusoidal signal, at a single frequency that is the cross-over frequency of the controller of the power converter, to provide a duty cycle to a power converter connected to a power grid, a current controller that monitors a reference current provided by a voltage controller of a DC link interfacing the grid connected converter with a motor drive, storage system or generation system, the current controller further monitors a current of the grid-side terminals of the power converter, and a parameter calculation module that calculates a plurality of gain values for the current controller based at least in part on a phase margin, a cross-over frequency, a current of an alternating current side of the power converter, and the duty cycle.

In addition to one or more of the features described above or below, or as an alternative, further embodiments could include that the duty cycle is further determined by a modulation of the perturbation injection and an output of the current controller.

In addition to one or more of the features described above or below, or as an alternative, further embodiments could include that the output of the current controller is determined by the gain values calculated by the regulation module and a current of an alternating current side of the power converter In addition to one or more of the features described above or below, or as an alternative, further embodiments could include that a magnitude and phase are calculated by taking discrete Fourier transforms of both the current and the duty cycle calculated at the cross-over frequency.

In addition to one or more of the features described above or below, or as an alternative, further embodiments could include an elevator motor drive system connected to the power converter connected to the grid.

In addition to one or more of the features described above or below, or as an alternative, further embodiments could include that the plurality of gain values include at least a proportional gain value.

According to a non-limiting embodiment of the present disclosure, a method for modulating a current level of an alternating current side of the power converter includes injecting a sinusoidal signal, at a single predetermined cross-over frequency, to provide a perturbation to the duty cycle of a power converter connected to the power grid, monitoring a current of an alternating current side of the power converter, monitoring a duty cycle and calculating a plurality of gain values for the current controller based at least in part on a phase margin, a cross-over frequency, the current of an alternating current side of the power converter, and the duty cycle.

In addition to one or more of the features described above or below, or as an alternative, further embodiments could include that the duty cycle is further determined by a modulation of the perturbation injection and an output of the current controller.

In addition to one or more of the features described above or below, or as an alternative, further embodiments could include the output of the current controller is determined by the gain values calculated by the regulation module and the current of an alternating current side of the power converter.

In addition to one or more of the features described above or below, or as an alternative, further embodiments could include a magnitude and a phase are calculated by taking discrete Fourier transforms of both the current and the duty cycle calculated at the cross-over frequency.

In addition to one or more of the features described above or below, or as an alternative, further embodiments could include the plurality of gain values include a proportional gain value, an integral gain value, and a derivative gain value.

In addition to one or more of the features described above or below, or as an alternative, further embodiments could include an elevator motor drive system connected to the power converter.

In addition to one or more of the features described above or below, or as an alternative, further embodiments could include the cross-over frequency is a single frequency and is a fixed value.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 1 is a schematic illustration of an elevator system;

DETAILED DESCRIPTION

Figure 1:
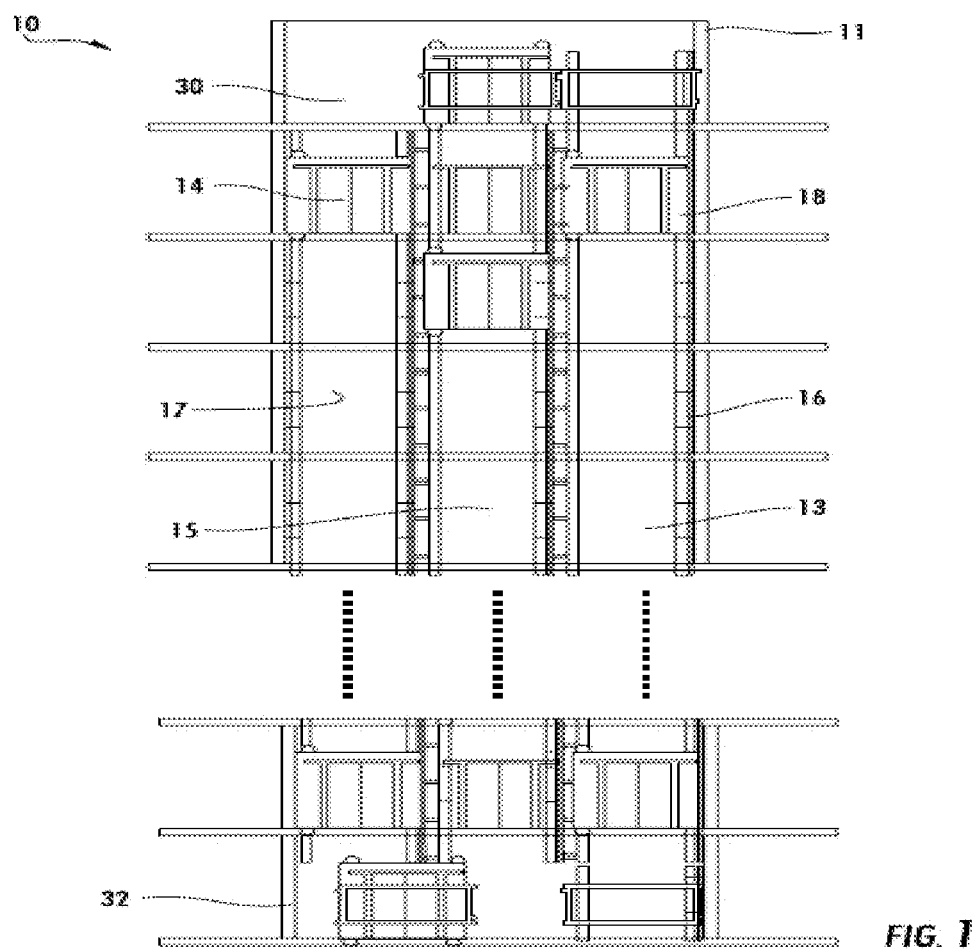

Referring to FIG. 1, an elevator system 10 may include a stationary support structure 11 that may generally be an integral part of a multi-story building, and at least one lane (i.e., three lanes 13, 15, 17 illustrated) having boundaries generally defined by the structure 11. The elevator system 10 further includes at least one car 14 that travels within at least one of the lanes 13, 15, 17. The car 14 may travel in a vertical direction, and may further be in a dedicated upward direction in lane 15 and a dedicated downward direction in lane 13 (as one, non-limiting, example). It is further contemplated and understood that the elevator system 10 may be self-propelled, and may have multiple cars 14 traveling in any one lane 13, 15, 17 with the multiple cars traveling in an upward direction in lane 15 and a downward direction in lane 13. In other embodiments, cars 14 may travel in two directions in a single lane.

Figure 2:
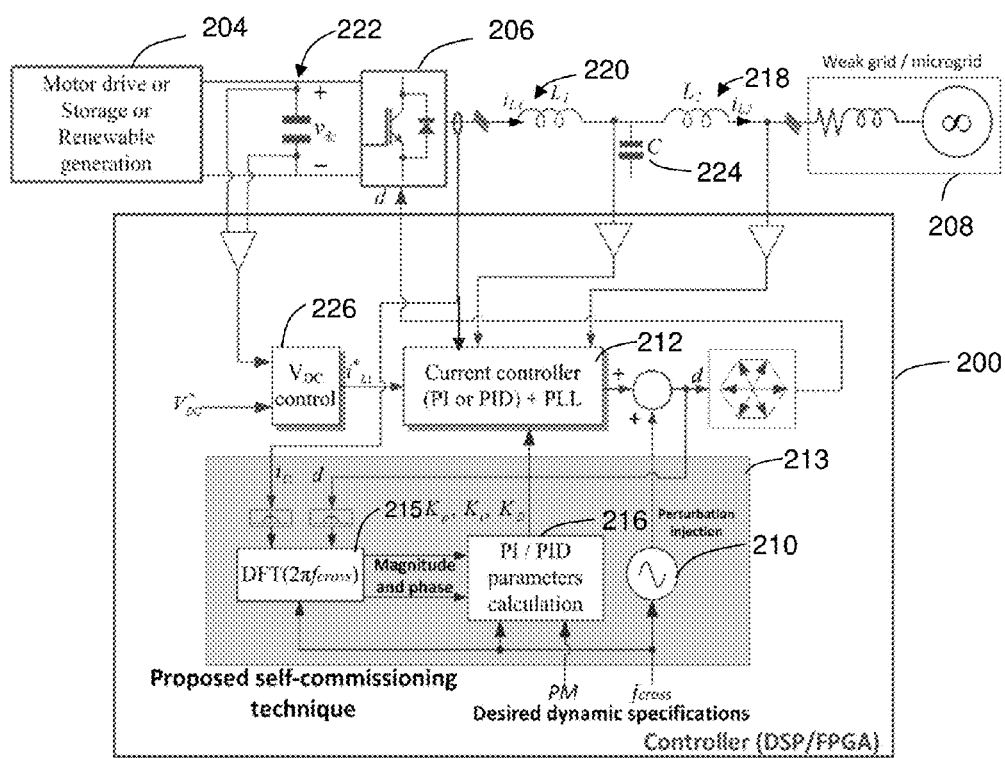
FIG. 2 illustrates a current controller in accordance with one embodiment of the present disclosure.

The elevator system 10 may further include at least one transfer station 30 generally located at or above the top floor and at or below the bottom floor. The at least one transfer station 30 may impart horizontal movement of the cars 14, thereby facilitating transfer of the cars 14 between lanes 13, 15, 17. Although not shown in FIG. 1, one or more intermediate transfer stations, similar to station 30 may be used between the first floor and the top floor. A lower transfer station 32 may be located at or below the bottom floor. FIG. 2 illustrates a controller 200 in accordance with one embodiment. The controller 200 may be connected to an electrical distribution system. The electrical distribution system may be connected to a motor drive 204 of an industrial system, which imparts motion on an elevator system 10, for example.

Although the system in FIG. 1 illustrates a multicar ropeless elevator system, it is further contemplated and understood that the controller 200 may be applied to any drive application including a roped elevator system. The controller 200 may also be applied to a heating, ventilation and air conditioning system, or any system connected to an electrical grid.

In other embodiments, the controller 200 and the electrical distribution system may be connected to a renewable generation system, or a storage system of an industrial system through a power converter 206, filter composed of inductors 218, 220, capacitor 224, and a DC link 222.

The electrical distribution system may include a power converter 206 that interfaces the motor drive 204 with the grid, for example. The controller 200 may monitor a reference current provided by a power converter 206, which may provide a direct current link interfacing the industrial system with the grid 208. In one embodiment, the power converter 206 is a bidirectional voltage-source-converter made up at least by six insulated-gate bipolar transistors (IGBTs). The power converter 206 is connected to the grid 208. In operation, the grid 208 may have a large impedance, compared with a conventional power grid. Accordingly, regulation of the power converter 206 may be required to ensure that an adequate level of power is provided to or from the motor drive 204. The regulation of the power converter 206 may be provided by a duty cycle generated by the controller 200 and can be based at least in part on the impedance of the grid 208. The controller 200 may monitor a current supplied to the grid-side terminals of the power converter 206, which supplies current to the motor drive 204 from the grid 208, or vice versa, as part of a current control configuration, the grid voltage used as part of a phase-locked loop (PLL) and as part of other functions incorporated into the current controller, such as feed-forward compensation or active damping, and the DC link bus voltage as part of a voltage control configuration of the voltage controller 226. The system is bidirectional, so the motor drive will provide power to the grid 208 during regenerative operation. The current controller may be implemented in stationary reference frame (either a-b-c frame or alpha-beta frame) or synchronous reference frame (d-q frame), for example, and may incorporate filters and de-coupling networks. The controller 200 may command the power converter 206 with a desired duty cycle, to operate in dynamically stable conditions and with dynamic performance determined by the phase margin and cross-over frequency specifications given as an input for the controller, for any required level of power for the motor drive 204 or another external system connected to the grid 208.

In some embodiments, the controller 200 may include a perturbation module 210. The perturbation module injects a sinusoidal signal as part of the duty cycle regulation of the power converter 206. As described in more detail below, the sinusoidal signal is injected at a single cross-over frequency, for example 480 hertz. The single cross-over frequency may be specified at the time of system installation. The need for a spectrum of frequencies to be applied to the perturbation signal is mitigated by the configuration disclosed in the embodiment of FIG. 2. As an advantageous feature of the present disclosure, using a single frequency instead of multiple frequencies leads to dramatic reduction of time required to identify parameters of a plant of the power converter required to tune the current controller and simpler implementation of the parameter calculation function.

In some embodiments, the controller 200 further comprises a current controller 212, a commissioning controller 213 and a voltage controller 226. The voltage controller 226 can be a DC link voltage controller. The current controller 212 monitors a reference signal provided by a voltage controller of the direct current link of the motor drive 204, and a grid side current, for example. The current controller 212 outputs a signal that is modulated with the sinusoidal signal. The modulated signal is injected as a duty cycle regulation of the power converter 206. The commissioning controller 213 can be applied in a similar manner to other types of controllers, such as a DC link voltage controller.

The modulation of the sinusoidal signal provided by the perturbation module 210 and the current controller determines a duty cycle of the power converter 206. In operation, the power converter 206 provides bi-directional regulation of the current at the grid-side terminal. Inductors 218, 220 and capacitor 224 may be present within the filter of the power converter, although a filter topology that does not include inductor 220 and capacitor 224, as well as other variations of these structures, may be present. The impedance may change because of variations of the grid 208 and any other loads connected to the grid 208.

In some embodiments, the commissioning controller 213 of the controller 200 further includes a parameter calculation module 216 that calculates a plurality of gain values for the current controller 212. The plurality of gain values may be based at least in part on a phase margin, cross-over frequency, the power converter AC current, and the duty cycle. The parameter calculation module 216 calculates the gain values for the current controller 212 based in part upon a magnitude value and a phase value generated by a magnitude and phase calculation.

The gain values for the current controller 212 can be calculated in a variety of ways based on the required phase margin and cross-over frequency for the loop gain, and magnitude and phase of the controlled plant. Some examples are provided below based on simple analytical expressions on continuous time domain. In those equations, Plant$_i$ represents the dynamic relation between the power converter AC current "$i_{L1}$" and the duty cycle "d", $\omega_{cross}$ represents the cross-over frequency, and PM represents the phase margin.

A PI controller can be used in one embodiment. The parameters fitting is carried out based on the system of equations (1).

$$\begin{cases} PI(s) = K_p \cdot \left(1 + \dfrac{1}{\tau \cdot s}\right) \\ \tau = \dfrac{\tan\left[(PM - \arg(Plant_i(j\omega_{cross})) - \dfrac{\pi}{2})\right]}{\omega_{cross}}, \\ K_p = \dfrac{\omega_{cross} \cdot \tau}{|Plant_i(j\omega_{cross})| \cdot \sqrt{1 + (\omega_{cross} \cdot \tau)}} \end{cases} \quad (1)$$

A PID may be useful for phase boosting and enhancement of dynamic performance when phase lag is significant due to digital delays. The implementation herein considered includes two coincident zeroes and two coincident high frequency poles, where the poles and the zeroes are separated in frequency by a factor $K_j$. The parameters fitting is carried out based on the system of equations (2).

$$\begin{cases} PID(s) = K_p \cdot \left(\dfrac{1}{s} \cdot \dfrac{\left(1 + s \cdot \dfrac{K_j}{\omega_{cross}}\right)^2}{\left(1 + s \cdot \dfrac{1}{K_j \cdot \omega_{cross}}\right)^2}\right) \\ K_j = \dfrac{\tan\left[\dfrac{1}{4} \cdot \left(\dfrac{\pi}{2} + PM - \arg(Plant_i(j\omega_{cross}))\right)\right]}{\omega_{cross}}, \\ K_p = \dfrac{\omega_{cross}}{|Plant_i(j\omega_{cross})| \cdot K_j^2} \end{cases} \quad (2)$$

Other linear controllers, such as PI compensator including Resonant compensators, are also considered in this disclosure and may be tuned following a similar procedure. Also, the plant may be calculated based on other AC current magnitude, such as $i_{L2}$.

A magnitude and phase module 215 calculates a magnitude and a phase of a plant of the power converter based on a relationship between a current at an alternating side of the power converter and the duty cycle at the cross-over frequency. The magnitude and phase are generated by taking Discrete Fourier Transforms of both the current and the duty cycle calculated at the cross-over frequency as a function of the current on the alternating current side of the power converter and the duty cycle of the perturbation signal. Those signals may be pre-processed before applying the Discrete Fourier Transform using, for example, band-pass filters. Instead of Discrete Fourier Transform, alternative means for calculation of magnitude and phase at the cross-over frequency may be applied. The gain values are additionally calculated by using the cross-over frequency and a phase margin value. The gain values may include a proportional gain value, an integral gain value, and a derivative gain value. The gain values are transmitted by the parameter calculation module 216 to the current controller 212.

In some embodiments, the current controller 212 measures the current flowing through the power converter 206. The reference for the current controller 212 of the current flowing through the power converter 206 may be provided by a voltage controller 226 regulating a voltage across a capacitor in a DC link 222. The regulating capacitor of the DC link 222 may be connected in parallel with the power converter 206 and the motor drive 204, for example. However, any suitable configuration may be possible to generate the reference current for the current controller 212 of the current of the alternating current side of the power converter 206. In some embodiments, the current controller 212 applies the proportional gain value, the integral gain value, and the derivative gain value to the error between the measured grid current value and the reference current value. However in other embodiments, only the proportional gain value may be applied, or only the proportional gain value and the integral gain value may be applied. Yet in other embodiments, the proportional gain value, and/or the integral gain value, and/or additional gain values may be applied. It is understood that the current controller 212 may include other configurations capable of providing additional gain values.

Consequently, the current controller 212 generates the adjusted grid current value, which is then modulated with the sinusoidal signal generated by the perturbation module 210.

Figure 3:
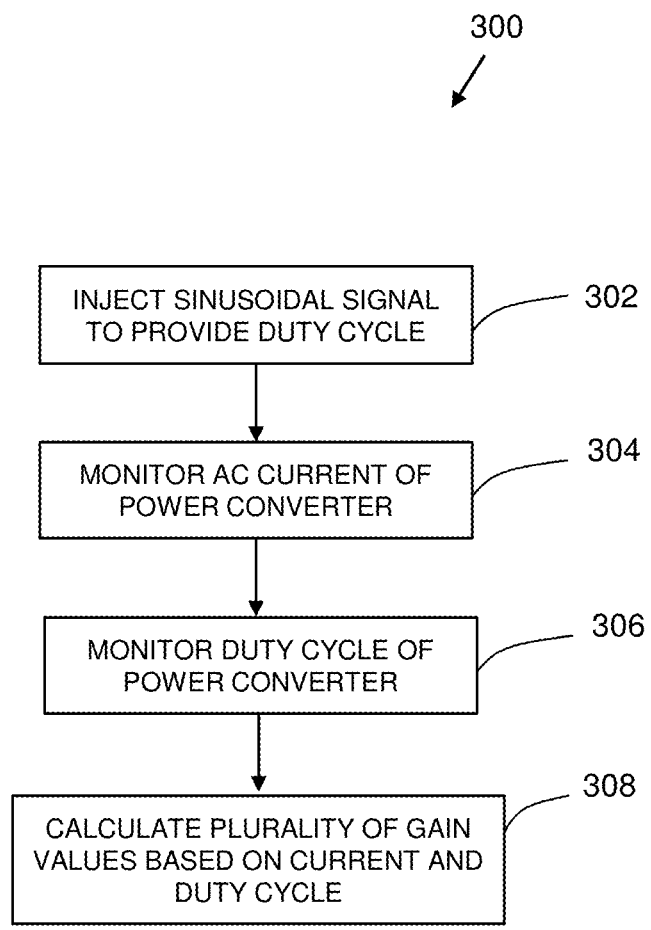
FIG. 3 illustrates a method for current controller commissioning in accordance with one embodiment of the present disclosure.

FIG. 3 illustrates a method of current regulation in accordance with one embodiment of the present disclosure. At block 302, a sinusoidal signal may be injected at a single predetermined cross-over frequency. The sinusoidal signal may provide a perturbation to the duty cycle to a power converter connected to a power grid, for example. The duty cycle may be further determined by a modulation of the perturbation injection and an output of the current controller.

At block 304, an AC current of a power converter connected to the power grid may be monitored. The current may be a measured value across an inductance of the converter AC filter. At block 306, a duty cycle of a power converter is monitored. At block 308, a plurality of gain values for the current controller are calculated. The plurality of gain values may be based at least in part on a phase margin, a cross-over frequency, the AC current of the power converter, and the duty cycle modulated by the injected sinusoidal signal. The plurality of gain values may be based additionally on a magnitude and phase calculation provided by discrete Fourier transforms of both the current and the duty cycle calculated at a single cross-over frequency.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims. Modifications and equivalents may be made to the features of the claims without departing from the scope of the invention.

The invention claimed is:

1. A system for modulating a current level of a power converter connected to a grid, the system comprising:
   a perturbation module that injects a sinusoidal signal, at a single frequency which is a cross-over frequency of a controller of the power converter, to provide a duty cycle to a power converter connected to the power grid; and
   a parameter calculation module that calculates a plurality of gain values for the controller based at least in part on a phase margin, a cross-over frequency, a current of an alternating current side of the power converter, and the duty cycle.

2. The system of claim 1, wherein the controller is a current controller that monitors at least a power converter current and at least a reference current, wherein the power converter current is measured at alternating current terminals of the power converter.

3. The system of claim 1, wherein the duty cycle is further determined by a modulation of the sinusoidal signal and an output of a current controller, wherein a reference provided for the current is provided by a voltage controller regulating a voltage across a capacitor in a direct current link.

4. The system of claim 3, wherein the output of the current controller is determined by the gain values calculated by the parameter calculation module and the current.

5. The system of claim 1, further including a magnitude and phase module that calculates a magnitude and a phase of a plant of the power converter connected to the grid based on a dynamic relationship between a current at an alternating side of the power converter and the duty cycle at the cross-over frequency.

6. The system of claim 5, wherein the magnitude and the phase are calculated by performing a discrete Fourier transform of the current at the alternating side and the duty cycle at the cross-over frequency.

7. The system of claim 1, wherein the plurality of gain values include at least a proportional gain value.

8. The system of claim 1, wherein the system is one of an elevator system and a heating, ventilation and air conditioning system.

9. A method of modulating a current level of a power converter, the method comprising:
   injecting a sinusoidal signal, at a single cross-over frequency, to provide a duty cycle to a power converter connected to a power grid;
   monitoring the duty cycle of the power converter;
   monitoring an AC current of the power converter; and
   calculating a plurality of gain values based at least in part on a phase margin, a cross-over frequency, a current of an alternating current side of the power converter, and the duty cycle.

10. The method of claim 9, wherein the duty cycle is further determined by a modulation of the sinusoidal signal and an output of a current controller.

11. The method of claim 10, wherein the output of the current controller is determined at least by the gain values, the current of the power converter and a reference current signal.

12. The method of claim 11, wherein a magnitude and a phase are calculated by taking a discrete Fourier transform of the current and the duty cycle at the cross-over frequency.

13. The method of claim 9, wherein the plurality of gain values include a proportional gain value, an integral gain value, and a derivative gain value.

14. The method of claim 9, wherein the cross-over frequency is a single frequency and is a fixed value.

15. An elevator motor drive system configured to perform the method of claim 9.

* * * * *